United States Patent [19]
Gubela, Sr.

[11] Patent Number: 6,010,223
[45] Date of Patent: Jan. 4, 2000

[54] SENSOR SYSTEM BASED ON RETROREFLECTION OF A LASER BEAM

[76] Inventor: Hans-Erich Gubela, Sr., Hundeberg 17, D-77887 Sasbachwalden, Germany

[21] Appl. No.: 09/105,143

[22] Filed: Jun. 26, 1998

[30] Foreign Application Priority Data

Jun. 30, 1997 [DE] Germany .......................... 197 27 527

[51] Int. Cl.$^7$ ............................. G02B 5/122; G02B 5/124
[52] U.S. Cl. ........................................... 359/529; 359/530
[58] Field of Search ..................................... 359/633, 850, 359/851, 529, 530; 356/152.3; 427/163.1, 163.4

[56] References Cited

U.S. PATENT DOCUMENTS

| | | | |
|---|---|---|---|
| 3,712,706 | 1/1973 | Stamm | 359/531 |
| 3,922,065 | 11/1975 | Schultz | 359/514 |
| 4,243,618 | 1/1981 | Van Arnam | 264/1 |
| 5,936,770 | 8/1999 | Nestegard et al. | 359/530 |

FOREIGN PATENT DOCUMENTS

4240680  6/1994  Germany .

OTHER PUBLICATIONS

JP 6–273608(A), In: "Patents Abstracts of Japan", P–1849, Dec. 26, 1994, vol. 18/No. 688.

*Primary Examiner*—Georgia Epps
*Assistant Examiner*—Ricky Mack
*Attorney, Agent, or Firm*—Collard & Roe, PC

[57] ABSTRACT

The invention relates to a sensor system based on the retroreflection of a laser beam comprising a retroreflection surface having a series of microtriplet reflectors. The sensor system has individual micro reflector elements that are formed by the three adjacent square surfaces of a cube corner. The individual micro reflector elements have a cross sectional area similar to an equilateral hexagon having a width over flats of 0.002 to 1.4 mm. With this design, the laser beam simultaneously contacts at least five microtriplets on the surface of the retroreflector.

2 Claims, 3 Drawing Sheets

(7 W)

(5 W)

(7 W)

(6 W)

(7 W)

(5 W)

(5 W)

(6 W)

(5 W)

SENSOR SYSTEM BASED ON RETROREFLECTION OF A LASER BEAM

BACKGROUND OF THE INVENTION

1. Field of the Invention

The invention relates to a sensor system based on the retroreflection of a laser beam.

The goal of this sensor system is to create a retroflective surface for laser sensor applications (laser sensorics) based on retroreflection and polarization rotation. This design supplies a laser signal with sharp contours for interpretation, thereby permitting significantly superior fine high-resolution scanning.

2. The Prior Art

Sensor systems designed to create the retroreflection of a laser beam are known in the art. For example, German Patent 42 40 680 A1 discloses a method of producing structured microtriple-element or microtriplet reflecting surfaces. According to this method, the retroreflecting microtriple reflector elements are similar to cubes, have a diameter in the range of 0.002 and 0.8 mm, and are combined in groups of identical microtriple reflector elements, whereby the diameter of such groups is smaller than 7 mm and the reflecting surface is formed by at least two or more groups.

Japanese patent 6-273608, describes a reflector having high reflection efficiency by forming a multitude of cube corners, which are arranged in different sizes on the reflecting surface in a mixed configuration.

In the field of sensor technology, laser sensor systems based on retroreflection and polarization rotation are known as reflex light barriers. Such reflex light barriers, which operate with laser light and polarization filters, are employed with retroreflectors. These retroreflectors can come in the form of expensive glass triple reflectors or triplets ground in large sizes, concave mirrors made of metal, and conventional triple reflectors made of glass or plastic. The interruption of the retroreflected beam between the retroreflector and the emitter or the receiver is interpreted as a binary signal.

The sensor system is designed to perform a series of calculations with different applications. The distance is calculated by finding the time required for the retroreflected beam to return. At the present time, laser light is preferred to control spreading of the beam of light to obtain an energetically strong signal with sharp contours for evaluation.

In gas analysis, the change in the spectrum of the retroreflected beam occurring in the glass flow chamber is evaluated.

To avoid errors in the interpretation of the signal, the laser beam is often additionally polarized, pulsated, or limited to a defined light spectra.

It is important to create a retroreflected beam with the sharpest possible contours. In this way, it is possible to distinguish the signal interpretation to be distinguishable from outside light or undesirable reflection rays.

Such undesirable reflection rays form when observing glass bottles in a bottle filling plant. Likewise, reflections are occur on metal, paint or plastic surfaces, when observing packages in a package distribution system. These objects can be observed with sensors. In addition undesireable reflections can occur when monitoring conveyor installations with sensors, or when scanning motor vehicles with sensors in car wash installations.

This fine resolution of the reflex sensor system depends on whether the retroreflector receives a sharply contoured signal that cannot be confused with outside radiation.

SUMMARY OF THE INVENTION

To have a sharply contoured signal, laser light is preferred. However, it was found that conventional retroreflectors operating with adequate precision are too costly to manufacture or adversely change the laser beam if the light source is moving, due to vibration if the sensor is mounted on a machine.

It is therefore an object of the sensor system to significantly improve fine scanning of the sensor system by deflecting the laser beam in an exact manner in the retroreflector and returning the transmission of a signal with sharp contours.

To solve this problem, a sensor system is proposed based on the following conditions:

Rule 1: The retroreflector must consist of a surface comprising a great number of small triple reflector elements lined up in rows. The smaller the triple reflector element, the smaller the interfering displacement of the beam between the incoming and the outgoing light beam.

Rule 2: to build such a retroreflector consisting of a great number of triple reflector elements or triplets for laser sensor applications, a cube-shaped full cube—also referred to as the Perkin-Elmer pyramid—is proposed as the only suitable retroreflection body. Its rectangular reflecting surfaces are disposed relative to one another at approximately 90° angles.

The Perkin-Elmer pyramid differs from a pyramidal triple reflector element because the pyramidal triple reflector element only represents a cube corner section.

It is assumed for the following explanations that the light incident on the reflector is received exactly perpendicular to the surface of the pyramidal triple retroreflector.

The reflecting surfaces of the pyramidal triple reflector are triangular. On these surfaces there are portions which, when the beam is deflected, do not find any suitable reference points in the other part areas of the triplet. Therefore, some of the rays do not find any suitable reference points for deflecting the light. To insure their return, these rays are transmitted through the glass body of the retroreflector consisting of a great number of triple reflector elements. Such rays are referred to herein as false or glass body rays.

On their way through the glass body of the pyramidal triple retroreflector, the false glass body rays then fall upon an adjacent triplet and penetrate it. Within the adjacent triplet they hit a reflecting surface, which now permits the rays to return. As a result, seven retroreflection ray bundles are obtained instead of one retroreflected ray bundle.

Viewing the pyramids from the top shows that each two pyramids have a common leg, and that these triplets are turned against each other by 180°. Thus, a pyramidal retroreflector consists of two groups of the same type of triplets which, however, differ from one another with respect to their alignment position.

Rule 3: each corner of the foot of a triple pyramid has a part area that is missing the third reference surface for a complete ray path for retroreflection. Each corner therefore produces a bundle of false glass body rays straying through the optical glass body until they hit upon effective deflecting surfaces.

In this way, two times three corners all pointing in different directions result in six separate ray pencils consisting of stray glass body rays, which find suitable reference surfaces only in adjacent triplets in order for them to return. When returning, all six pencils or bundles form a pattern conforming to the corner points of a hexagon because in each case, all directions of the corners of the pyramids are turned against each other by 60°.

The emitted laser beam, which is comprised of an emitted bundle of rays, hits one or a plurality of pyramidal triplets depending on whether it strikes across its diameter on only one or a plurality of light admission surfaces of the triplets. The light admission surface is a triangle at the foot of the three-sided pyramid.

The emitted laser beam bundle hits the center of the pyramid or pyramids and finds three suitable reference points for the deflection of the light and complete retroreflection returns in the form of a central cone of rays. Therefore, vertical irradiation of the pyramidal retroreflector with a bundle of laser rays results in a retroreflection pattern consisting of one central cone of rays and six surrounding glass body stray beams.

The pyramidal retroreflector responds to one emitted bundle of laser rays—the emitted bundles of rays—with seven separate bundles of laser rays, namely the retroreflected central cone of rays and six bundles of glass body stray rays. The pyramidal retroreflector is therefore unsuitable for fine scanning with laser light.

On the other hand, the retroreflector consisting of cube-shaped full cube triplets or reflector elements responds with one single central bundle of rays. This distinction is particularly important to understand why retroreflectors with full cube reflector elements or triplets are proposed for the method as defined by the invention.

Rule 4: The position accuracy of the measuring system is inversely related to the size of the triplets. Therefore, the design should include a great number of triplets because many small triplets are preferable to one large triplet.

The form or shape of the retroreflected bundle of rays is decisive for an exact measuring system.

However, what has been disregarded in connection with earlier retroreflectors consisting of a great number of reflector elements is that the emitted bundle of rays changes its form when it is retroreflected.

A simple cause is that the reflecting portions of the triplets are not exactly angularly positioned, or that the part surfaces are not planed but rough or curved. But even if the portions are shaped optically correct, other important conditions have to be taken into consideration.

Rule 5: The full cube triplets must be aligned relative to each other with absolute uniformity. The retroreflected bundle of rays is otherwise unnecessarily widened and deformed.

Rule 6: The full cube triplets must be sufficiently small to ensure that the emitted bundle of rays hits at least five (5) full cube triplets of the retroreflector. If the number of triplets hit is increased, there is also a relative increase in dimensional stability of the retroreflected bundle of rays.

The cause for such change in the shape of the retroreflected bundle of rays lies in the geometry of the full cube triplets. Viewed vertically from the top, each full cube triplet has a horizontal sectional area in the form of a hexagon. All full cube triplets thus form a surface of hexagonal mirrors, herein referred to as honeycomb cells, which when lined up in rows result in a beehive honeycomb pattern.

Now, if a bundle of emitted rays is moved in the form of a circle or an ellipse across the honeycomb-like mirror surfaces, the number of mirrors contacted changes constantly. However, the diameter or the shape of the beam can be reduced to such an extent that it will hit only one cell of the honeycomb structure and will be narrower and shorter than the outer edge of such a cell. The emitted beam, however, would no longer be retroreflected in that case when hitting the edge of a cell.

Therefore, the shape or form of the beam has to be large enough for it to simultaneously contact two cells when it moves from one cell to the next. As the light is deflected in the full cube triplet, three points are contacted in a cell. These points are located apart from one another and distributed over the cell depending on the angle of incidence.

Therefore, if one moves the emitted bundle of rays across the honeycomb cells, and if such bundle has a diameter smaller than the imagined inner circle of a hexagon, one two or three cells are illuminated depending on the position. This means that the form of the retroreflected bundle of rays changes in the course of the movement, from 100% up to 200% or almost 300%.

To maintain precision when measuring, strong variations in the form of the retroreflected beam have to be prevented. The number of contacted cells increases with the enlargement of the form of the emitted beam or with the reduction in the size of the full cube triplets. However, the variation in the width of the contacted cells decreases during the movement of the emitted bundle of rays, and the relative deformation of the retroreflected bundle of rays will considerably diminish with such a decrease.

Therefore, the shape of the emitted bundle of rays can be selected so that when it moves across the retroreflector it will contact in each position at least five or more full cube triplets simultaneously. A key width of the full cube triplets from 0.002 to 1.4 mm is proposed for laser scannings of the retroreflector in practical applications, such a key width describing the spacing between two parallel sides of the six-sided base area of the full cube triplet.

BRIEF DESCRIPTION OF THE DRAWINGS

Other objects and features of the present invention will become apparent from the following detailed description considered in connection with the accompanying drawings which disclose two embodiments of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF THE PREFERRED EMBODIMENT

Figure 1:
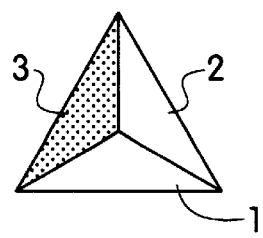
FIG. 1 shows a prior art version of a pyramidal reflector element.

Referring to FIG. 1 there is shown a prior art version of a pyramidal reflector element formed by three adjacent triangular surfaces 1, 2, or 3 of a cube section. The triangles are shown as equilateral triangles; however, the length of their legs may vary. In FIG. 1, the center axis of the pyramidal triplet has a perpendicular alignment. However, the center axis may also be disposed outside of the perpendicular alignment.

Figure 2:
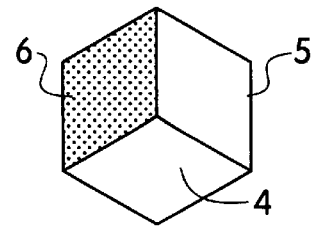
FIG. 2 shows a full cube triplet reflector element.

FIG. 2 shows a full cube triplet formed by three adjacent square faces 4, 5, or 6 of a cube corner. In FIG. 2, the center axis of the full cube triplet is aligned perpendicular. However, the center axis may also be disposed outside of the perpendicular alignment as well.

Figure 3:
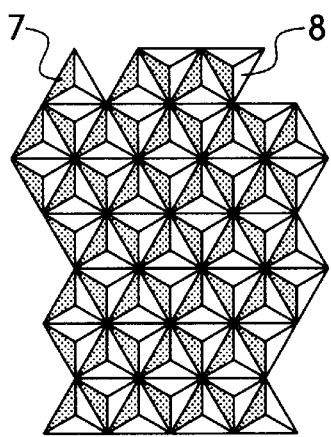
FIG. 3 shows a prior art version of a cutout of a retroreflector formed by a series of pyramidal reflector elements.

FIG. 3 shows the prior art version of a cutout of a retroreflector formed by pyramidal triplets 7 or 8 as shown in FIG. 1, whereby the surface consists of triplets turned with different orientations. For example, triplet 8 is turned by 180° relative to triplet 7.

Figure 4:
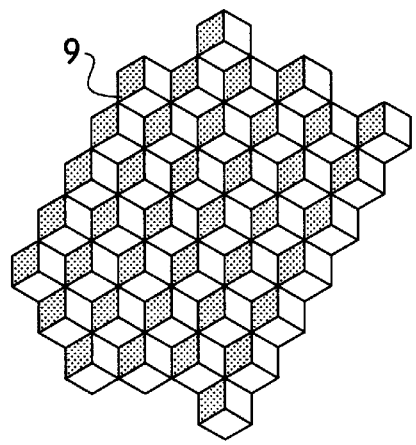
FIG. 4 shows a cutout of a retroreflector formed by a cubed reflector element.

FIG. 4 shows a cutout of a retroreflector consisting of full cube triplets each having a projected base area in the form of a six-sided cell. The retroreflector is formed by full cube triplets 9 as shown in FIG. 2, all having the same alignment. However, the retroreflector may also be formed by triplets with different orientations of rotation.

Figure 5:
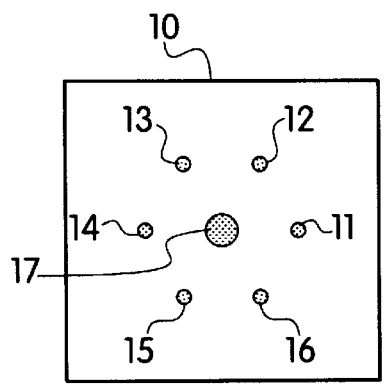
FIG. 5 shows a prior art version of a monitor surface of a measuring system for retroreflected laser light.

FIG. 5 shows a prior art version of a monitor surface 10 of a measuring system for retroreflected laser light. This monitor surface is created from monitoring a pyramidal retroreflector receiving laser light. The six retroreflected bundles of stray glass body rays 11, 12, 13, 14, 15, and 16 and the retroreflected central bundle of rays 17 are visible on the monitor.

Figure 6:
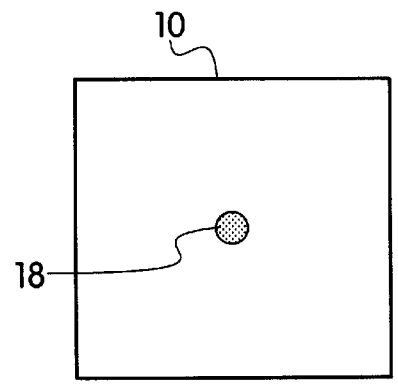
FIG. 6 shows a monitor screen comprising full cube triplets.

FIG. 6 shows a monitor screen 10 of a measuring system for retroreflected laser light for monitoring a retroreflector consisting of full cube triplets illuminated with laser light. No bundles of stray glass body rays are visible on the monitor, but only one single retroreflected central bundle of rays 18.

Figure 7:
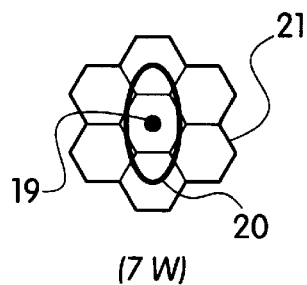
FIG. 7 shows a bundle of laser rays in the form of an ellipse hitting seven cells on a retroreflector.

FIG. 7 shows a bundle of laser rays in the form of an ellipse 20 and the center 19 hitting a retroreflector consisting of full cube triplets 21 (reflector elements). The full cube triplets are shown as cells only by their base area. The ellipse contacts seven cells. With retroreflection this means in this case that seven full cube triplets participate in the retroreflection of the bundle of laser rays. Each full cube triplet displaces the outgoing rays relative to the axis of the incoming rays. This retroreflection causes shape distortion of the incoming bundle of rays depending on the number of participating full cube triplets and their positions.

FIGS. 8 to 15 show the same bundle of rays in the form of an ellipse. However, in each of FIGS. 8 to 15, the center 19 with its ellipse 20 is slightly displaced relative to the respective cell. Changing cells are contacted due to the change in position of the bundle of rays, which in each case results in a different deformation of the deflected pencil of rays.

Figure 8:
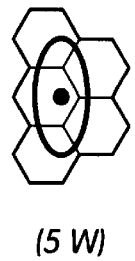
FIG. 8 shows five cells contacted by the pencil of rays.
Figure 9:
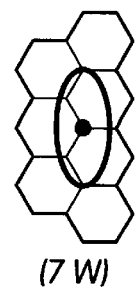
FIG. 9 shows seven cells contacted by the pencil of rays.
Figure 10:
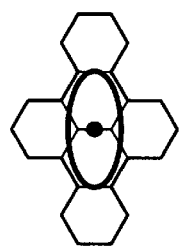
FIG. 10 shows 6 cells contacted by the pencil of rays.
Figure 11:
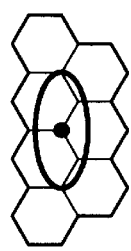
FIG. 11 shows seven cells contacted by the pencil of rays.
Figure 12:
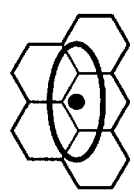
FIG. 12 shows five cells contacted by the pencil of rays.
Figure 13:
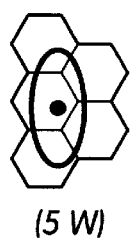
FIG. 13 shows five cells contacted by the pencil of rays.
Figure 14:
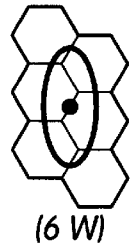
FIG. 14 shows six cells contacted by the pencil of rays.
Figure 15:
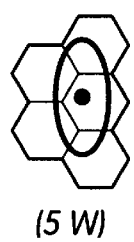
FIG. 15 shows five cells contacted by the pencil of rays.

In FIG. 8, five cells are contacted by the pencil of rays; while in FIG. 9 it is seven cells; in FIG. 10 it is six cells; in FIG. 11 it is seven cells; in FIG. 12 it is five cells; in FIG. 13 it is five cells; in FIG. 14 it is five cells; and in FIG. 15 it is five cells.

This example thus shows the lowest number of cells contacted by the ray is five while the highest number of cells is seven. The ellipse shown thus corresponds with a laser beam of the proposed relative minimum size of five full cube triplets.

Figure 16:
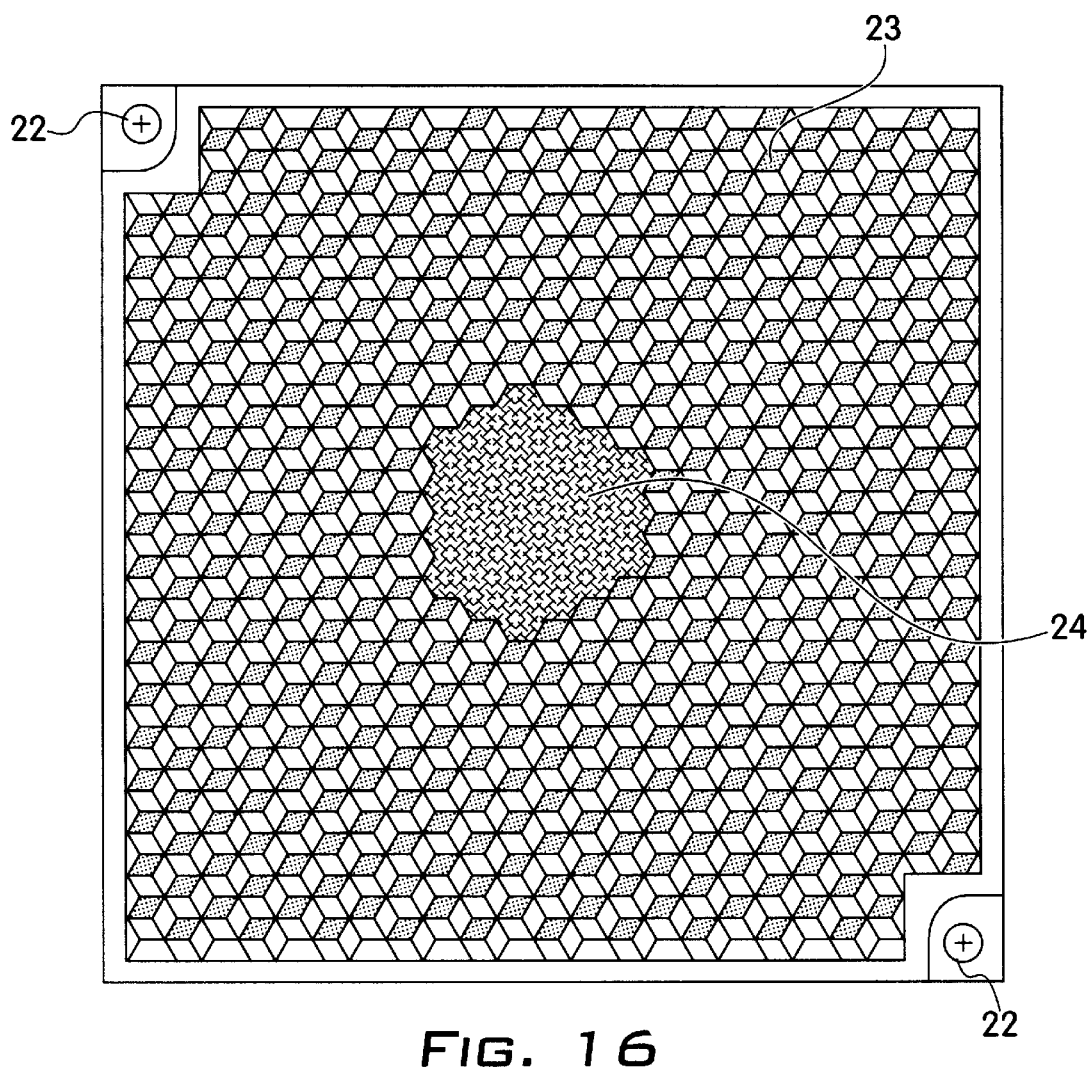
FIG. 16 shows an area of a retroreflector having different sized full cubed triplets.

FIG. 16 shows a special design of the micro retroreflector, which is a retroreflector consisting of two differently sized full cube triplets. The retroreflector with an edge length of about 100 by 100 mm has two screw holes 22 for mounting. The predominant part of the retroreflector is formed by full cube triplets 23 with a key width or width over flats of 4 mm. An area 24 with smaller full cube triplets with a size of about 1 mm key width is located in the center of the retroreflector.

The rules specified above are applied to this special design as well.

Figure 17:
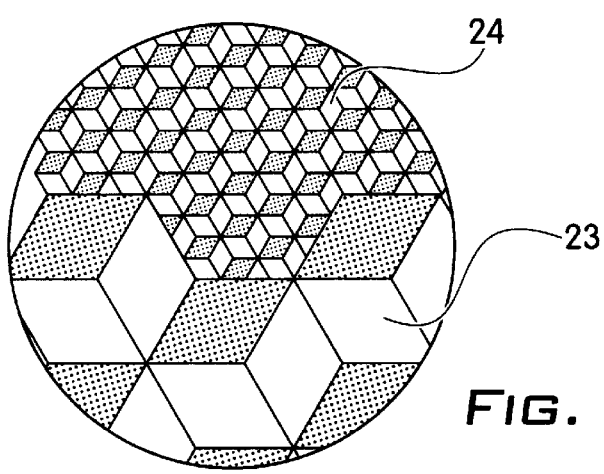
FIG. 17 shows an enlarged cutout of an area of FIG. 16.

FIG. 17 shows an enlarged cutout of an area of FIG. 16 where the areas consisting of large-size full cube triplets 23 meets the area of small size full cube triplets 24. Both areas contact each other without any special line of separation.

This design is advantageous if the retroreflector has to be observed from varied distances. The diameter of the bundle of emitted rays naturally increases as the distance grows and contacts an increasingly larger surface or area of the retroreflector. In the present example, once the bundle of emitted rays aimed at the center of the retroreflector has exceeded a diameter of approximately 30 mm, this beam contacts not only the smaller-sized full-cube triplets but also the larger-sized ones. These triplets generally have a slightly higher retroreflection power because the total area of retroreflection contains fewer triplet edges, wherein each edge is a straying, non retroreflecting surface. By using larger full cube triplets with a greater scanning spacing between the emitter and the retroreflector, the energy loss is compensated by higher retroreflection power output of the large triplets.

The key widths or widths across flats of the full cube triplets should be selected depending on the size of the diameter of the emitted beam, or based on the shape of the beam. The more full cube triplets that are covered engaged by the emitted beam, the smaller the percent deformation of the retroreflected bundle of rays. The lower the deformation, the more exact the measurements that can be taken with the bundle of rays.

The retroreflector in FIG. 16 shows it is possible to obtain with relative consistency, and without steps, the measuring range and the enlargement or reduction of the light cone of the corresponding emitted bundles of rays.

Accordingly, while several embodiments of the present invention have been shown and described, it is to be understood that many changes and modifications may be made thereunto without departing from the spirit and scope of the invention as defined in the appended claims.

What is claimed is:

1. A sensor system for retroreflecting a laser beam, said system having a retroreflective surface comprising:

a series of reflective cubes;

a series of microtriple reflectors, being formed by three adjacent square faces on the corner of a reflective cube; and a series of equilateral hexagons formed by a surface on said microtriple reflectors, wherein the distance between two parallel facing sides in said hexagons is between 0.002 mm to 1.4 mm, and the microtriple reflectors are positioned so that a laser beam simultaneously contacts at least five microtriple reflectors on the retroreflection surface.

2. The sensor system according to claim 1, wherein said retroreflector surface contains a first region that contains a first set of microtriplets of a first size and a second region that contains a second set microtriplets of a second larger size.

* * * * *